(12) United States Patent
Higashi

(10) Patent No.: US 7,567,301 B2
(45) Date of Patent: Jul. 28, 2009

(54) FLAT PANEL TELEVISION

(75) Inventor: Norihiro Higashi, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 854 days.

(21) Appl. No.: 10/957,390

(22) Filed: Oct. 2, 2004

(65) Prior Publication Data

US 2005/0117054 A1     Jun. 2, 2005

(30) Foreign Application Priority Data

Oct. 2, 2003     (JP)     ............................. 2003-344658

(51) Int. Cl.
*H04N 5/66* (2006.01)
*H04N 5/202* (2006.01)
*H04N 5/57* (2006.01)
*H04N 9/74* (2006.01)
*G09G 5/00* (2006.01)
*G06K 9/34* (2006.01)
*G06K 9/40* (2006.01)

(52) U.S. Cl. ........................ 348/671; 348/383; 348/674; 348/676; 348/687; 348/584; 345/602; 345/640; 382/171; 382/173; 382/254

(58) Field of Classification Search ................... 348/383, 348/674, 676, 671, 672, 678, 687, 584, 588, 348/597, 598, 599, 564, 565, 790, 791; 358/521; 382/173

See application file for complete search history.

(56) References Cited

U.S. PATENT DOCUMENTS

| | | | | |
|---|---|---|---|---|
| 5,291,295 | A * | 3/1994 | Srivastava | 348/805 |
| 5,805,117 | A * | 9/1998 | Mazurek et al. | 345/1.3 |
| 5,969,767 | A * | 10/1999 | Ishikawa et al. | 348/564 |
| 5,977,946 | A * | 11/1999 | Mizobata | 345/418 |
| 6,556,253 | B1 * | 4/2003 | Megied et al. | 348/565 |
| 6,570,611 | B1 * | 5/2003 | Satou et al. | 348/189 |
| 6,766,055 | B2 * | 7/2004 | Matsugu et al. | 382/173 |
| 6,809,776 | B1 * | 10/2004 | Simpson | 348/565 |
| 7,154,558 | B2 * | 12/2006 | Yui et al. | 348/565 |
| 7,170,634 | B2 * | 1/2007 | Kanai | 358/1.9 |

(Continued)

FOREIGN PATENT DOCUMENTS

JP     7-298096     11/1995

(Continued)

OTHER PUBLICATIONS

Japanese Notice of Reasons for Refusal, dated Nov. 8, 2006.

*Primary Examiner*—Brian P Yenke
(74) *Attorney, Agent, or Firm*—Yokoi & Co., U.S.A., Inc.; Peter Ganjian

(57) ABSTRACT

According to the invention, performing torn curb correction processing by referring to plural correction tables 113a to 113c for plural display areas A, B, C, D, E, and P makes it possible to obtain an output image meeting user's requirements. Particularly, since tone curve correction processing can be performed by referring to different correction tables selected from the correction tables 113a to 113c for a main screen to be displayed in the display areas A, B, C, D, and E and for a subscreen to be displayed in a sub-display area P, discomfort to a viewer attributable to a difference in brightness between the main screen and the subscreen can be prevented.

2 Claims, 7 Drawing Sheets

U.S. PATENT DOCUMENTS

| | | | |
|---|---|---|---|
| 7,266,240 B2 * | 9/2007 | Matsuda | 382/167 |
| 7,298,352 B2 * | 11/2007 | Kang et al. | 345/87 |
| 7,312,832 B2 * | 12/2007 | Huang et al. | 348/561 |
| 2002/0122048 A1 * | 9/2002 | Kanai | 345/690 |
| 2008/0002216 A1 * | 1/2008 | Matsushima | 358/1.9 |
| 2008/0219595 A1 * | 9/2008 | Hoshino | 382/303 |

FOREIGN PATENT DOCUMENTS

| | | |
|---|---|---|
| JP | 11-98438 | 4/1999 |
| JP | 2000-032367 | 1/2000 |

* cited by examiner

FIG. 5

Setting table 114

| Main screen | Sub-screen | A | B | C | D | E | P | User setting |
|---|---|---|---|---|---|---|---|---|
| Mode 1 | Darker than normal | 113c | 113c | 113c | 113c | 113c | 113a | OFF |
| | Normal | | | | | | 113b | OFF |
| | Brighter than normal | | | | | | 113c | OFF |
| Mode 2 | Darker than normal | 113b | 113b | 113b | 113b | 113b | 113a | OFF |
| | Normal | | | | | | 113b | OFF |
| | Brighter than normal | | | | | | 113c | OFF |
| Mode 3 | Darker than normal | 113a | 113a | 113a | 113a | 113a | 113a | OFF |
| | Normal | | | | | | 113b | OFF |
| | Brighter than normal | | | | | | 113c | OFF |
| Mode 4 | Darker than normal | 113c | 113b | 113a | 113b | 113c | 113a | ON |
| | Normal | | | | | | 113b | OFF |
| | Brighter than normal | | | | | | 113c | OFF |
| Mode 5 | Darker than normal | 113a | 113b | 113c | 113b | 113a | 113a | OFF |
| | Normal | | | | | | 113b | OFF |
| | Brighter than normal | | | | | | 113c | OFF |
| Area coordinates | | X=1~128 | X=129~256 | X=257~384 | X=385~512 | X=513~640 | X=401~560 Y=301~420 | |

| Serial pixel number n | Ordinate (Y) | Abscissa (X) |
|---|---|---|
| 1 | 1 | 1 |
| 2 | 1 | 2 |
| 3 | 1 | 3 |
| ⋮ | ⋮ | ⋮ |
| 307200 | 480 | 640 |

— 115

FLAT PANEL TELEVISION

BACKGROUND OF THE INVENTION

1. Field of the Invention

This invention relates to a flat panel television and more particularly to a flat panel television which performs correction by referring to a correction table.

2. Description of the Prior Art

There has been a known, conventional flat panel television in which images of different channels are simultaneously displayed in split screens which are individually subjected to correction processing (see, for example, the description of the conventional technology in Reference 1).

Since, in the conventional flat panel television, correction processing is performed individually for each split screen, it is possible to suppress the discomfort caused to viewers by interchannel differences in the luminance of input video signals.

Reference: Japanese Patent Laid Open No. 2000-32367

In the above conventional flat panel television, whereas correction processing can be performed individually for different split screens, it is not possible to perform different correction processings for plural areas of a screen irrespective of split screens. Therefore it is not possible to meet user's requirements such as making an image somewhat brighter in areas on both sides of the screen and somewhat darker in the center of the screen.

SUMMARY OF THE INVENTION

The present invention has been made in view of the above problem with the conventional flat panel television and it is an aim of the invention to provide a flat panel television capable of performing correction in different degrees for different areas of a screen.

To achieve the aim of the invention, the invention described in a first aspect resides in improvement in a flat panel television comprising an image data generating device to generate image data which comprises gradation data on each pixel making up a screen based on an input video signal, and a correcting device to store a correction table which gives a correspondence between input gradation values and output gradation values required for display on a display panel and to change the image data by referring to the correction table. The improvement includes the following arrangements:

The image data generating device is capable of inputting a plurality of the video signals from a plurality of channels, generating main image data to be displayed over all areas of the screen from the video signal inputted from one channel and subimage data to be displayed on a sub-display area from the video signal inputted from another channel, the sub-display area being an area occupying a part of the screen, and generating composite image data comprising the main image data with its portion corresponding to the sub-display area replaced with the subimage data.

The correcting device has a plurality of different correction tables corresponding to a plurality of the areas, is capable of updating and storing the correspondence between the areas and the corresponding correction tables, and changes the image data for each pixel by referring to the correction table corresponding to the area where the pixel exists.

In the improvement provided by the invention described in the first aspect, the image data generating device generates image data based on an input video signal. The image data comprises gradation data on each pixel making up a screen. The correcting device stores plural correction tables which give correspondences between input gradation values and output gradation values required for display on a display panel. The correcting device changes the image data by referring to the corresponding correction table.

The image data generating device is capable of inputting a plurality of the video signals from a plurality of channels. The image data generating device generates main image data to be displayed over all areas of the screen from the video signal inputted from one channel and also generates subimage data to be displayed on a sub-display area from the video signal inputted from another channel, the sub-display area being an area occupying a part of the screen. Furthermore, the image data generating device can generate composite image data comprising the main image data with its portion corresponding to the sub-display area replaced with the subimage data. With this arrangement, it is possible to display a composite image such as a multichannel image combining images inputted from different channels.

The correcting device includes a plurality of different correction tables corresponding to a plurality of areas of the screen. For the sub-display area, too, the corresponding correction tables are stored. The correcting device changes the image data for each pixel by referring to the correction table corresponding to the area where the pixel exists. That is, tone curve correction is performed for the pixel by determining the correction table to refer to for the pixel and then referring to the correction table so determined. Thus, it is possible to selectively use a plurality of different correction tables stored as described above for the areas of the screen. In other words, it is possible to perform different tone curve corrections according to the areas of the screen. Since the correspondences between the areas and the correction tables can be updated and stored, it is possible for a user to set an additional one of the correction tables for each of the areas based on user's requirements.

The invention as described in a second aspect resides in improvement in a flat panel television comprising an image data generating device to generate image data which comprises gradation data on each pixel making up a screen based on an input video signal, and a correcting device to store a correction table which gives a correspondence between input gradation values and output gradation values required for display on a display panel and to change the image data by referring to the correction table. The improvement includes arrangements that the correcting device has a plurality of different correction tables corresponding to a plurality of areas of the screen and that the correcting device changes the image data for each pixel by referring to the correction table corresponding to the area where the pixel exists.

In the improvement provided by the invention described in the second aspect, the image data generating device generates image data based on an input video signal. The image data comprises gradation data on each pixel making up a screen. The correcting device stores plural correction tables which give correspondences between input gradation values and output gradation values required for display on a display panel. The correcting device changes the image data by referring to the corresponding correction table.

The correcting device includes a plurality of different correction tables corresponding to a plurality of areas of the screen. The correcting device changes the image data for each pixel by referring to the correction table corresponding to the area where the pixel exists. That is, correction is performed for the pixel by determining the correction table to refer to for the pixel and then referring to the correction table so determined. Thus, it is possible to selectively use a plurality of different correction tables stored as described above for the areas of the screen. In other words, it is possible to perform different corrections according to the areas of the screen.

The invention described in a third aspect resides in improvement wherein:

the image data generating device is capable of inputting a plurality of the video signals from a plurality of channels, generating main image data to be displayed over all areas of the screen from the video signal inputted from one channel and subimage data to be displayed on a sub-display area from the video signal inputted from another channel, the sub-display area being an area occupying a part of the screen, and generating composite image data comprising the main image data with its portion corresponding to the sub-display area replaced with the subimage data.

In the improvement provided by the invention described in the third aspect, the image data generating device can input a plurality of the video signals from a plurality of channels. The image data generating device can generate main image data to be displayed over all areas of the screen from the video signal inputted from one channel and subimage data to be displayed on a sub-display area from the video signal inputted from another channel, the sub-display area being an area occupying a part of the screen. The image data generating device can also generate composite image data comprising the main image data with its portion corresponding to the sub-display area replaced with the subimage data. It is therefore possible to display a composite image such as a multichannel image combining images inputted from different channels. For the sub-display area, too, tone curve correction can be performed by referring to the correction table corresponding to the sub-display area.

The invention described in a fourth aspect resides in improvement wherein the correcting device accepts changes in the correspondences between the areas and the corresponding correction tables, and updates and stores the correspondences. In the improvement provided by the invention described in the fourth aspect, the correspondences between the areas and the corresponding correction tables can be updated so that it is possible to perform tone curve correction meeting user's requirements.

According to the invention described in the first and second aspects, a flat panel television capable of performing different correction processings for different areas of a screen is provided.

According to the invention described in the third aspect, different correction processings can be performed for a sub-screen and for a main screen.

According to the invention described in the fourth aspect, correction processing meeting user's requirements can be performed.

BRIEF DESCRIPTION OF THE DRAWINGS

FIG. 5 shows a setting table.

FIG. 7 shows a coordinate table.

DESCRIPTION OF THE PREFERRED EMBODIMENT

Figure 1:
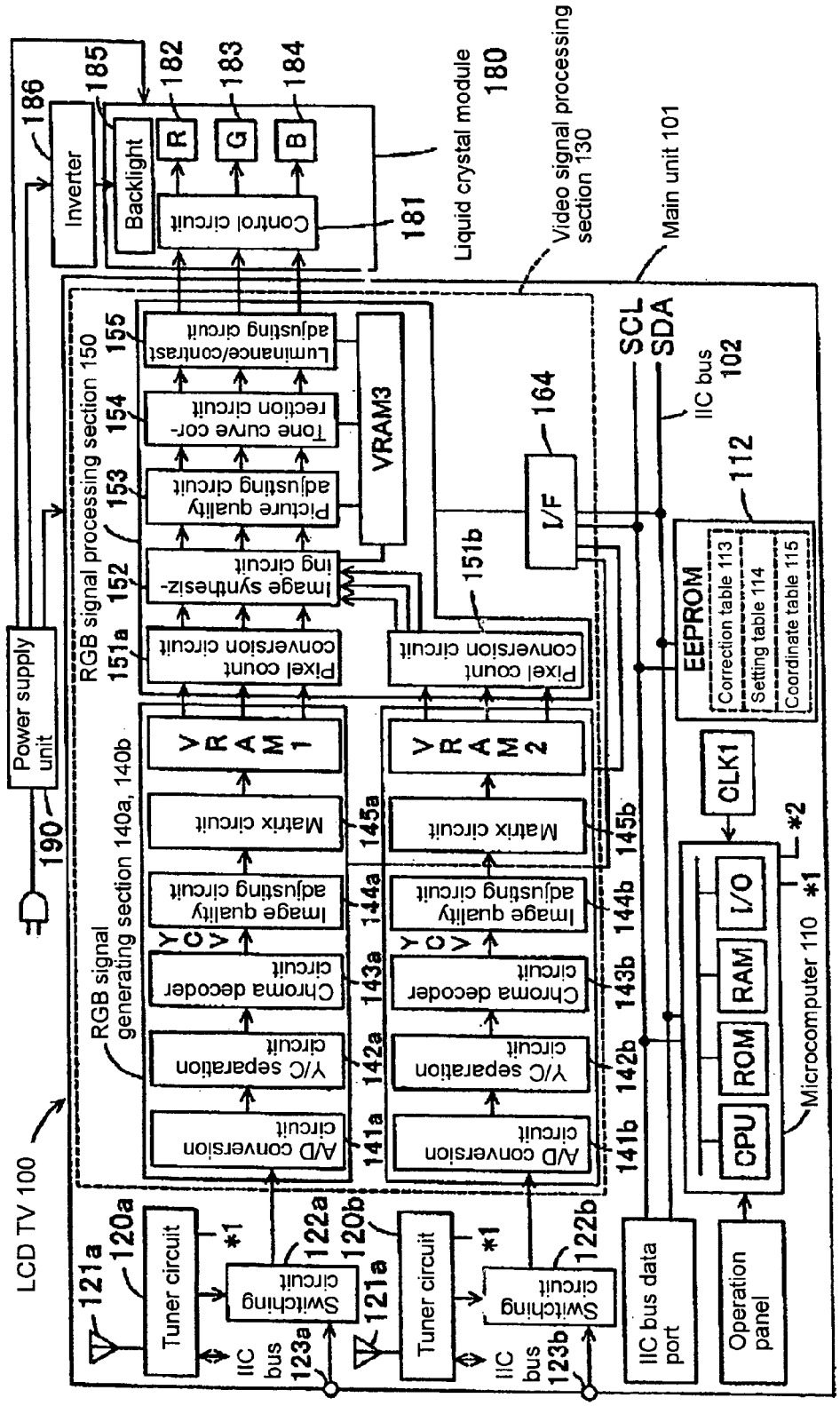
FIG. 1 is a block diagram showing the structure of a liquid crystal display television.

The preferred embodiment of the invention will be described in detail in the following order:
(1) Structure of a flat panel television
(2) Tone curve correction
(3) Conclusion (1) Structure of a Flat Panel Television FIG. 1 is a block diagram showing the structure of a liquid crystal display television (LCD TV) 100 as an example of flat panel television. The display device to which the invention applies is not limited to liquid crystal panels. The invention may be applied to other display devices such as plasma panels. The LCD TV 100 comprises a power supply unit 190, a main unit 101, an inverter 186, and a liquid crystal module (LCD display) 180. The power supply unit 190 supplies the main unit 101, the inverter 186 and the liquid crystal module (LCD display) with prescribed direct-current voltages. The inverter 186 receiving a direct-current voltage from the power supply unit 190 generates a high voltage and supplies the high voltage to a backlight 185 included in the liquid crystal module 180.

The main unit 101 comprises an IIC bus data port 103, a microcomputer 110, an operation panel 111, an EEPROM 112, two tuner circuits 120a and 120b, two antennas 121a and 121b, two switching circuits 122a and 122b, two composite video input terminals 123a and 123b, a video signal processing section 130 and a CLK1. Connected to an IIC bus 102 comprising a clock line SCL and a data line SDA are the IIC bus data port 103, the microcomputer 110, the EEPROM 112, two tuner circuits 120a and 120b each having a publicly known tuner IC as a principal part, and an interface (I/F) 164 included in the video signal processing section 130. These circuits mutually send and receive serial data via the IIC bus 102. The tuner circuits 120a and 120b are connected to the microcomputer 110 with signal lines and operate being controlled based on signals inputted from the microcomputer 110 via the signal lines.

The video signal processing circuit 130 with its principal part comprising an IC has two RGB signal generating sections 140a and 140b, an RGB signal processing section 150 and the I/F 164. The RGB signal generating section 140a comprises an A/D conversion circuit 141a, a Y/C separation circuit 142a, a chroma decoder circuit 143a, an image quality adjusting circuit 144a, and a matrix circuit 145a. The RGB signal generating section 140b has a configuration similar to that of the RGB signal generating section 140a. The RGB signal processing section 150 comprises two pixel count conversion circuits 115a and 151b, an image synthesizing circuit 152, a picture quality adjusting circuit 153, a tone curve correction circuit 154, and a luminance/contrast adjusting circuit 155.

The oscillation circuit CLK1, the operation panel 111 and a remote-control light receiving section (not shown) are connected to the microcomputer 110. When a data input operation is performed at the operation panel 111, the microcomputer 110 can receive the corresponding data from the operation panel 111. The microcomputer 110 comprises a CPU, a ROM, a RAM, plural I/O ports, and a timer circuit (not shown) which are connected to an internal bus. The CPU controls the overall operation of the TV in accordance with internal circuit control programs written in the ROM and the EEPROM 112, thereby materializing functions of the TV.

The microcomputer 110 can accept settings for displaying a subscreen based on a different channel or a different input line in a sub-display area included in a main screen (so-called picture-in-picture settings) and data inputted to specify a size and location of the sub-display area via the operation panel 111 or a remote-control light receiving section (not shown). The subscreen data specified is stored as sub-display area coordinate values in a setting table 114 included in the EEPROM 112. The microcomputer 110 can also accept tone curve correction data inputted by the user. The data set by the user is stored in the setting table 114 included in the EEPROM 112. The setting table 114 will be described in detail later.

The EEPROM 112 stores a tone curve correction table (correction table) 113 which gives a correspondence between input gradation values and output gradation values for reference when correcting a tone curve. The EEPROM 112 also stores the setting table 114 in which the subscreen data and the tone curve correction data set by the user are stored as described above and a coordinate table 115 in which coordinates of each pixel are specified.

The two tuner circuits 120a and 120b are provided. They are publicly known tuner circuits for analog television, each having an IC as a principal part. The tuner circuits 120a and 120b can obtain an analog television signal (video signal) of a prescribed television standard from the antennas 121a and 121b, respectively. The tuner circuits 120a and 120b can each generate an intermediate frequency (IF) signal from the received analog television signal and then output the generated IF signal. Among the prescribed television standards are PAL, SECAM and NTSC. The tuner circuits may be capable of receiving television signals of plural television standards and generating an IF signal. The tuner circuits 120a and 120b each incorporate a frequency synthesizer and comprise a high-frequency amplifier circuit, a local oscillator circuit and a mixer circuit (which are not shown). Tuner circuits of a voltage synthesizer type are also usable.

The two switching circuits 122a and 122b are also provided. They are connected to the tuner circuits 120a and 120b, respectively. The switching circuits 122a and 122b each have an IC as a principal part. The microcomputer 110 is connected to each of them and they are also connected to the composite video input terminals 123a and 123b, respectively. They each selectively receive an IF signal coming from the corresponding tuner circuit 122a or 122b and an analog composite video signal (a type of video signal) coming in via the corresponding composite video input terminal 123a or 123b according to a selection instruction given by the microcomputer 110. They then each output the input video signal after separating a synchronizing signal from it to the corresponding RGB signal generating section 140a or 140b.

The RGB signal generating sections 140a and 140b are connected to the I/F 164. They perform required processings according to instructions given by the microcomputer 110. The A/D conversion circuits 141a and 141b each receive the video signal from which the synchronizing signal has been separated, convert the video signal into a digital signal by converting the voltage difference between the white level and black level of the video signal into 256 gradation values, and then output the digital signal comprising digital gradation values to the corresponding Y/C separation circuit 142a or 142b. The Y/C separation circuits 142a and 142b each separate the received digital signal into a luminance signal Y and a carrier chrominance signal C and output the separated signals to the corresponding chroma decoder circuits 143a or 143b. The chroma decoder circuits 143a and 143b each generate a YUV signal corresponding to the received luminance signal Y and carrier chrominance signal C, and then output the YUV signal to the corresponding picture quality adjusting circuit 144a or 144b.

The picture quality adjusting circuits 144a and 144b each subject the received YUV signal to such processings as contrast adjustment, tint adjustment, brightness adjustment, color adjustment such as skin color correction, luminance range adjustment, delay adjustment, and horizontal sharpness adjustment, and then output the adjusted YUV signal to the corresponding matrix circuit 145a or 145b. The matrix circuits 145a and 145b each receive the adjusted YUV signal and combine the adjusted YUV signal with a luminance signal Y and color difference signals R-Y and B-Y to generate RGB signals representing three primary colors.

The RGB signals are generated for each pixel. The RGB signals generated in the matrix circuits 145a and 145b are stored in the corresponding video memories VRAM1 and VRAM2, respectively. The two video memories VRAM1 and VRAM2 and another video memory VRAM3 to be described later are each a buffer to store RGB signals for one frame of picture. In each of these buffers, the address where to store the RGB signals for each pixel is prescribed. To store image data for one frame of picture in one of the buffers, the prepared RGB signals are entered in the buffer sequentially address by address. Because the RGB signal storing address is prescribed for each pixel, when an address where RGB signals are stored are known, which pixel the RGB signals are associated with can be determined. In the present embodiment, video memories (VRAMs) are used to store image data and the pixel with which image data is associated can be determined based on the address where the image data is stored. An arrangement in which gradation data and the pixel numbers or coordinate data associated with the gradation data are stored in memory may also be used.

The RGB signals are gradation data represented by digital gradation values. Larger gradation values create a brighter picture (with higher luminance) and smaller gradation values create a darker picture (with lower luminance). The present embodiment will be described on the premise that liquid crystal panels 182 to 184 each have 640 horizontal pixels by 480 vertical pixels and that the total number of gradation values representing digital gradations is 256, that is, from 0 to 255. It goes without saying, however, that the liquid crystal panels 182 to 184 of the present invention may have a different number of pixels than '640 horizontal pixels by 480 vertical pixels'. They may each have, for example, 1024 horizontal pixels by 768 vertical pixels or, to be compatible with a wide screen, 1440 horizontal pixels by 900 vertical pixels.

Whereas the tuner circuits 120a and 120b through the matrix circuits 145a and 145b number two each by type, the RGB signal processing section and the subsequent circuits number one each by type. In the following description of the present embodiment, the RGB signals outputted from the matrix circuit 145a will be referred to as the first image data and the RGB signals outputted from the matrix circuit 145b will be referred to as the second image data.

The RGB signal processing section 150 is connected to the I/F 164 and performs required processing according to instructions given by the microcomputer 110. The RGB signal processing section 150 has two pixel count conversion circuits 151a and 151b to which the first and the second image data stored in the VRAM1 and the VRAM2 are inputted, respectively.

The pixel count conversion circuits 151a and 151b which are also referred to as scalers read out the RGB signals from the VRAM1 and the VRAM2, respectively, and subject the RGB signals to prescribed scaling processing to convert the pixel count as required according to the number of pixels of each of the liquid crystal panels 182 to 184 or of the sub-display area in which to display a subscreen. The number of pixels of the sub-display area in which to display the subscreen is obtained from the subscreen data stored in the setting table 114 included in the EEPROM 112.

Take an example of displaying an image provided by a channel selected by the first tuner circuit 120a according to an instruction given by the microcomputer 110 as a main screen and an image provided by a channel selected by the second tuner circuit 120b according to an instruction given by the microcomputer 110 as a subscreen. The first pixel count conversion circuit 151a converts the number of pixels of the first image data into 640 horizontal pixels by 480 vertical pixels and the second pixel count conversion circuit 151b converts the number of pixels of the second image data into a value (for example, 160 horizontal pixels by 120 vertical pixels) fitting the sub-display area to be used.

After the first image data to be used as main image data and the second image data to be used as sub-image data have undergone pixel count conversion in accordance with instructions given by the microcomputer 110, the image synthesizing circuit 152 synthesizes the first and the second image data. The process based on the present example is as follows. With regard to the second image data, the synthesizing circuit 152 generates image data by obtaining coordinate data on the sub-display area where to display the subscreen from the setting table 114 and associating the second image data whose pixel count has been converted into '160 horizontal pixels by 120 vertical pixels' with the coordinates of the sub-display area, whereas, for other areas than the sub-display area, generating zero-gradation image data for each of the R, G and B components. With regard to the first image data whose pixel count has been converted into '640 horizontal pixels by 480 vertical pixels', the synthesizing circuit 152 generates image data representing gradation values for the first image except for a portion corresponding to the sub-display area. For the portion corresponding to the sub-display area of the first image, the synthesizing circuit 152 generates zero-gradation data for each of the R, G and B components. The synthesizing circuit 152 subsequently superimposes the image data it generated to obtain synthesized image data which represents a screen showing the first image data containing the second image data in the sub-display area.

The VRAM3, which stores image data like the VRAM1 and the VRAM2, receives the synthesized image data and stores it. The picture quality adjusting circuit 153, sequentially referring to the gradation value of each pixel for each of the R, G and B components stored in the VRAM3, processes the gradation values making up the RGB signals that have undergone pixel count conversion for such adjustments as contour correction, on-screen display (OSD) signal superimposition and saturation correction. The tone curve correction circuit 154 performs tone curve correction referring to the correction table 113. The details of processing performed in the tone curve correction circuit 154 will be described later. The luminance/contrast adjusting circuit 155 processes the image data that is stored in the VRAM3 after undergoing tone curve correction and that represents the gradation value of each pixel for each of the R, G and B components for luminance and contrast adjustment. The image data having undergone luminance and contrast adjustment is outputted to a control circuit 181 included in the liquid crystal module 180.

The control circuit 181 is an electronic circuit to control and drive screen display. Based on the image data stored in the VRAM3, the control circuit 181 generates display driving voltages for each pixel for each of the R, G and B components. The generated voltages are used to drive a liquid crystal panel for R 182, a liquid crystal panel for G 183 and a liquid crystal panel for B 184. From the addresses in the VRAM3 from which it read out the gradation data, the control circuit 181 determines the pixels of the liquid crystal panels 182, 183 and 184 to be driven based on the gradation data. The backlight 185 lights by having a required high voltage supplied by the inverter 186. The light emitted by the backlight 185 is transmitted through the liquid crystal panels 182, 183 and 184 from behind toward the front side of the liquid crystal panels. As a result, the liquid crystal module 180 displays an image based on the image data, that is, an image corresponding to the video signal on a screen 199.

(2) Tone Curve Correction

Figure 2:
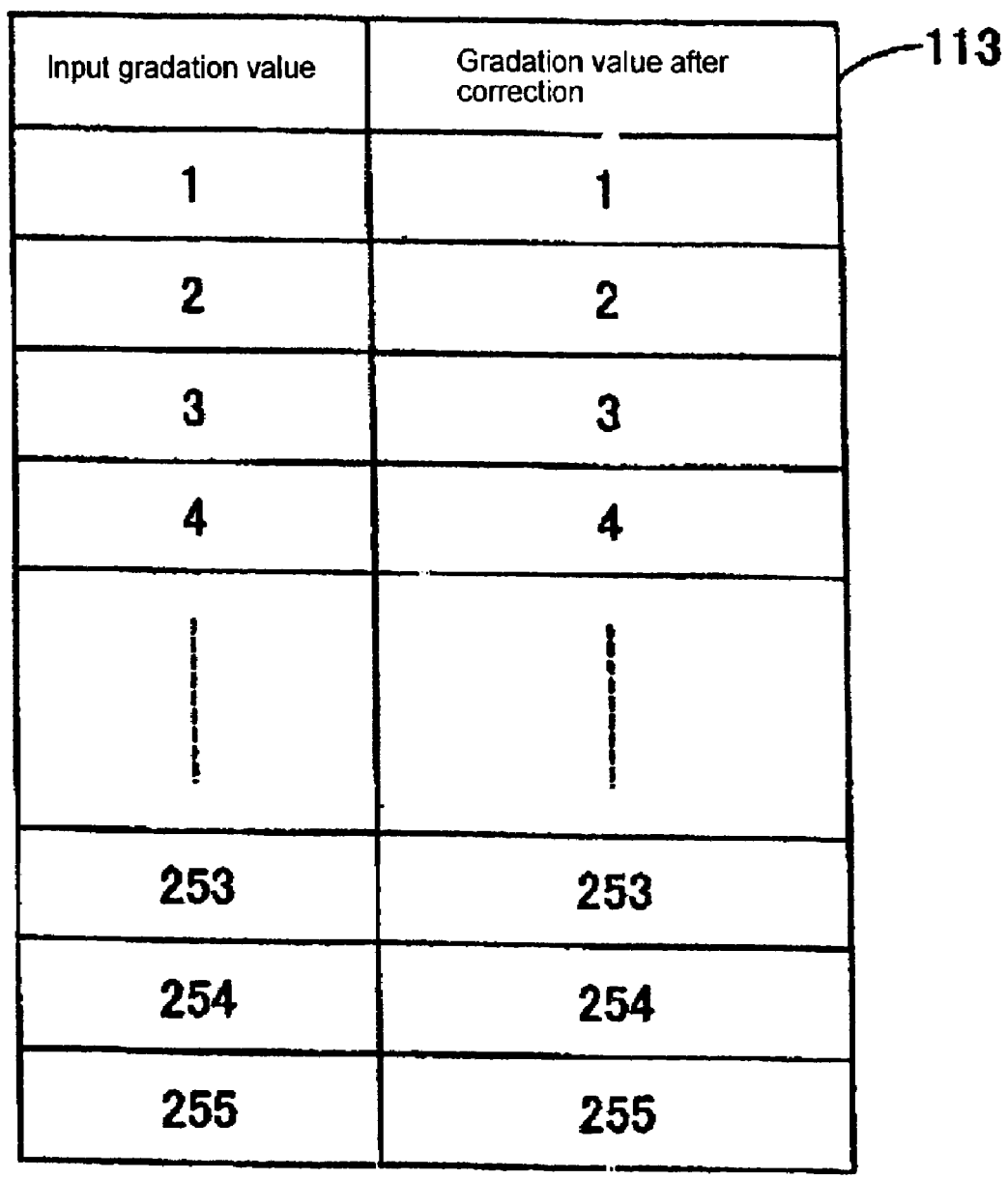
FIG. 2 shows a correction table.

FIG. 2 shows an example correction table 113 stored in the EEPROM 112. The correction table 113 stores input gradation values and the corresponding output gradation values after tone curve correction. In the example shown in FIG. 2, an input gradation value 254 corresponds to an output gradation value after tone curve correction of 254. When an input gradation value is obtained from the correction table 113, the corresponding output gradation value after tone curve correction can be obtained. In the present embodiment, three different correction tables 113a to 113c are stored in the EEPROM 112.

Figure 3:
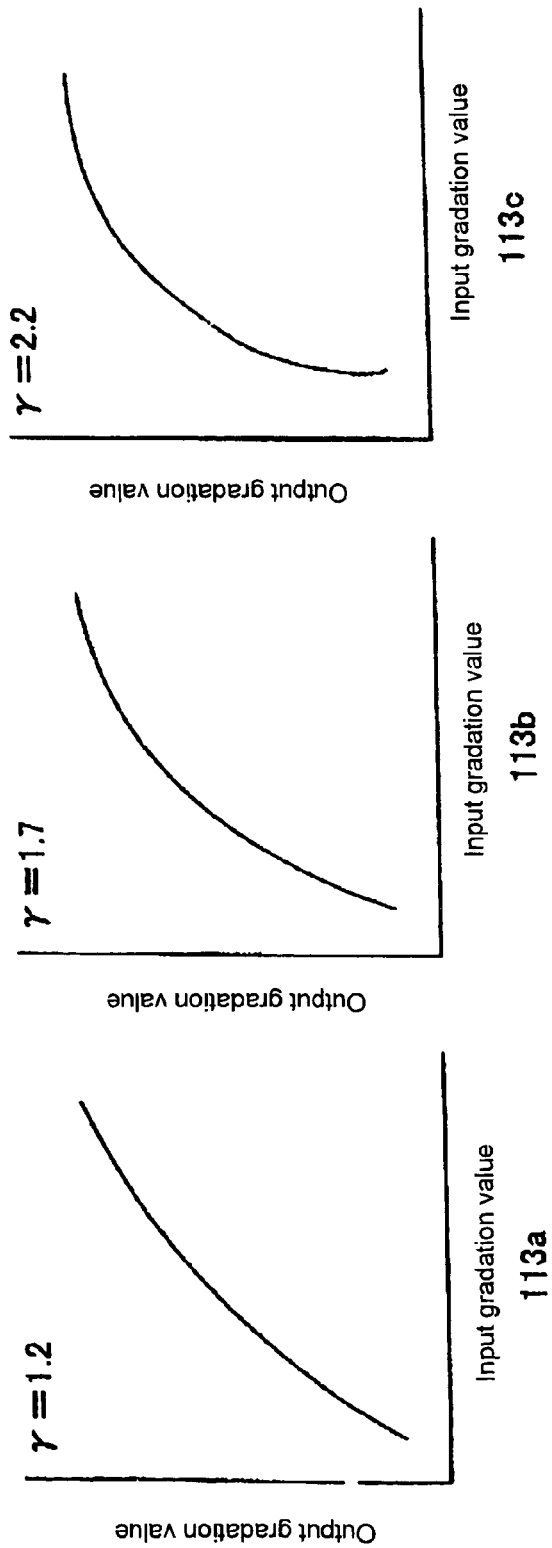
FIG. 3 shows graphs representing correction tables.

FIG. 3 is a diagrammatic representation of the three correction tables 113a to 113c. The three graphs shown in FIG. 3 represent the correspondences between input gradation values and output gradation values given by the correction tables 113a to 113c, respectively. The following equation (1) applies to the correspondence between input gradation values and output gradation values given by any of the correction tables 113a to 113c. More precisely, when a constant value of 1.2 is assigned to "γ" in the equation, the equation represents the gradation value correspondence given by the correction table 113a. Similarly, when a constant value of 1.7 is assigned to "γ" in the equation, the equation represents the gradation value correspondence given by the correction table 113b, and when a constant value of 2.2 is assigned to "γ" in the equation, the equation represents the gradation value correspondence given by the correction table 113c.

$$b = 256 \times \left(\frac{a}{256}\right)^{\frac{1}{\gamma}} \qquad \text{[Equation 1]}$$

where a represents an input gradation value and b represents an output gradation value after correction.

The tone curve correction circuit 154 applies tone curve correction to the RGB signals that have been processed for the adjustments described in the foregoing, thereby compensating for the display characteristics of the liquid crystal module 180. The tone curve correction circuit 154, referring to the correction tables 113a to 113c held in the EEPROM 112, obtains the output gradation value corresponding to the input gradation value for each pixel for each of the R, G and B components from the correction tables 113a to 113c. The tone curve correction circuit 154 then generates image data after tone curve correction by replacing the input gradation value with the output gradation value obtained as described above.

With the three different correction tables 113a to 113c provided, the image display characteristics vary depending on which correction table is used. When the correction table 113a, which is associated with a constant value of 1.2 to be assigned to "γ" in the equation (1) as described above, is used, the image data is corrected to generate a darker-than-normal image. When the correction table 113c, which is associated with a constant value of 2.2 to be assigned to "γ" in the equation (1) as described above, is used, the image data is corrected to generate a brighter-than-normal image. When the correction table 113b, which is associated with a constant value of 1.7 to be assigned to "γ" in the equation (1) as described above, is used, the image data is corrected to generate an image with normal brightness. These three correction tables 113a to 113c with different correction characteristics are selectively used for each pixel depending on the area to which the pixel belongs on each of the three liquid crystal panels 182 to 184.

Figure 4:
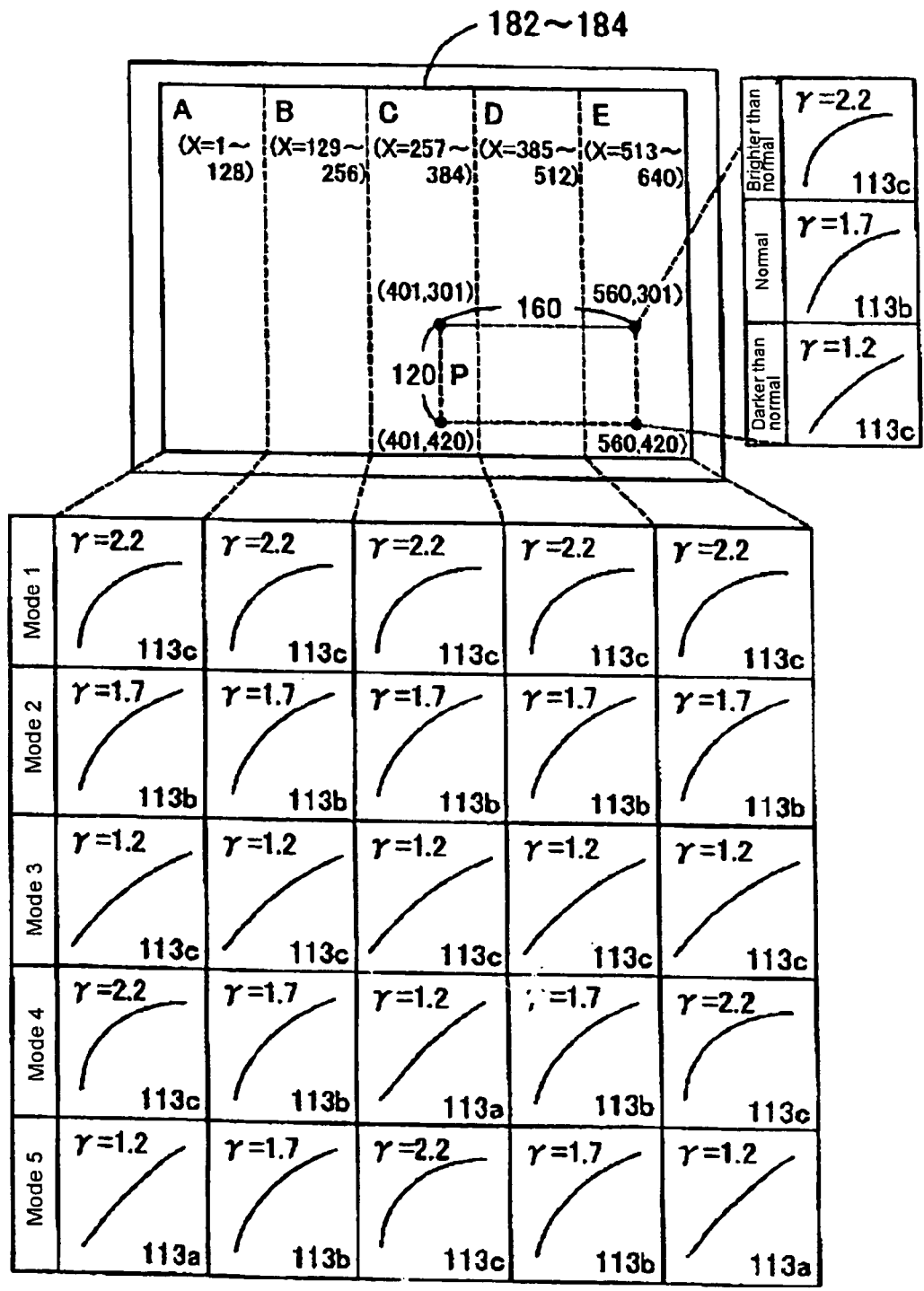
FIG. 4 is a diagrammatic representation of the relationship between screens and correction tables.

FIG. 4 is a diagrammatic representation of the relationship between the areas on each of the liquid crystal panels 182 to 184 and the correction tables 113a to 113c to be used for the areas. In FIG. 4, each of the crystal liquid panels 182 to 184 is divided widthwise into five areas marked A to E from left to right. A sub-display area P equivalent to '160 horizontal pixels by 120 vertical pixels' located on each crystal liquid panel is also shown in FIG. 4. The areas A, B, C, D, E, and P can be defined by their abscissa (X) and ordinate (Y) on the liquid crystal panels 182 to 184. The area A, for example, accommodates the pixels whose abscissa (X) ranges from 1 to 128.

In mode 1, tone curve correction based on the correction table 113c to generate a brighter-than-normal image is performed for all areas of the liquid crystal panels 182 to 184. In mode 2, tone curve correction based on the correction table 113b is performed for all areas of the liquid crystal panels 182 to 184. In mode 3, tone curve correction based on the correction table 113a to generate a darker-than-normal image is performed for all areas of the liquid crystal panels 182 to 184. In the above three modes, one of the correction tables 113a to 113c is used for all areas of the liquid crystal panels 182 to 184 so that it is possible to make the whole screen brighter or darker than normal.

In mode 4, the correction table 113c is used for the side areas A and E, whereas the correction table 113b is used for the areas B and D and the correction table 113a is used for the middle area C. With this arrangement for tone curve correction, it is possible to make the side areas A and E brighter than normal and the middle area C darker than normal. When, for example, the background appears dark and unclear on the side areas of an image showing a person standing in the spotlight in the middle area, it is possible using this mode to make the background in the side areas brighter without making the middle area to be excessively bright.

It is the other way around in mode 5. In mode 5, the correction table 113a is used for the side areas A and E, the correction table 113b is used for the areas B and D, and the correction table 113c is used for the middle area C. With this arrangement for tone curve correction, it is possible to make the side areas A and E darker than normal and the middle area C brighter than normal. For example, when an image shows a backlit person in the middle area and the person appears dark and unclear, it is possible using this mode to make the person in the middle area brighter without making the background in the side areas excessively bright. Excessively bright side area portions of an image become more conspicuous on a widescreen TV; because in a widescreen TV, pixels in areas on both sides of the screen are laterally enlarged for display on the screen. Mode 5 enables effective tone curve correction in such a situation.

In the present embodiment, it is also possible to perform tone curve correction for the sub-display area P using one of the correction tables 113a to 113c. For example, in a case where a subscreen is too bright and excessively conspicuous, the sub-display area P showing the subscreen can be made less bright using the correction table 113a. Conversely, when a subscreen is dark and unclear, the sub-display area showing the subscreen can be made less dark using the correction table 113c. Thus, it is possible to balance the main screen and subscreen in brightness or make either of the two screens more conspicuous than the other.

Information on the correspondence between the areas on each of the liquid crystal panels 182 to 184 and the correction tables 113a to 113c to be used for the areas as shown in FIG. 4 is stored in the EEPROM 112. FIG. 5 shows an example of the setting table 114. As shown in FIG. 5, the coordinate data representing areas A, B, C, D, E, and P are stored as area coordinates. Area coordinates 114a representing the sub-display area P is, as described above, updated by the microcomputer 110 when the area setting is updated by the user. When setting is made to enlarge a subscreen, the area coordinates 114a is updated to represent the correspondingly enlarged sub-display area P. When no subscreen is to be displayed, the area coordinates 114a representing the sub-display area P becomes blank. The setting table 114 stores information on the correspondence between the areas and the correction tables 113a to 113c to be used for the areas for every setting combination available. In the example shown in FIG. 4, there are five main screen setting modes 1 to 5 and three subscreen setting modes, that is, brighter than normal, normal, and darker than normal so that there are a total of 15 main screen and subscreen mode combinations. The correspondence information stored in the setting table 114 represents 15 setting patterns corresponding to the 15 mode combinations.

As described above, the microcomputer 110 can accept user settings for tone curve correction. More concretely, the user can select any of modes 1 to 5 for the main screen and any of the "brighter than normal", "normal" and "darker than normal" settings for a subscreen. When a combination of settings, that is, a setting pattern is selected, the microcomputer 110 sets an ON indication for the selected setting pattern in the user setting column 114b of the setting table 114. In the example shown in FIG. 5, mode 4 is selected for the main screen, "normal" is selected for the subscreen, and an ON indication for the corresponding setting pattern is set in the user setting column 114b.

The arrangement of the setting table 114 is not limited to the above-described and varied arrangements are adoptable depending on the specifications of the LCD TV 100. For example, there may be plural sub-display areas to allow plural subscreens to be displayed. The are as A, B, C, D, and E may be further divided by increasing the number of data fields as required to accommodate increased setting data. The areas A, B, C, D, and E need not be fixed in size and location. Their area coordinates may be made user-settable. The areas A, B, C, and D need not necessarily represent vertically divided areas as in the present embodiment. They may represent horizontally divided areas.

Figure 6:
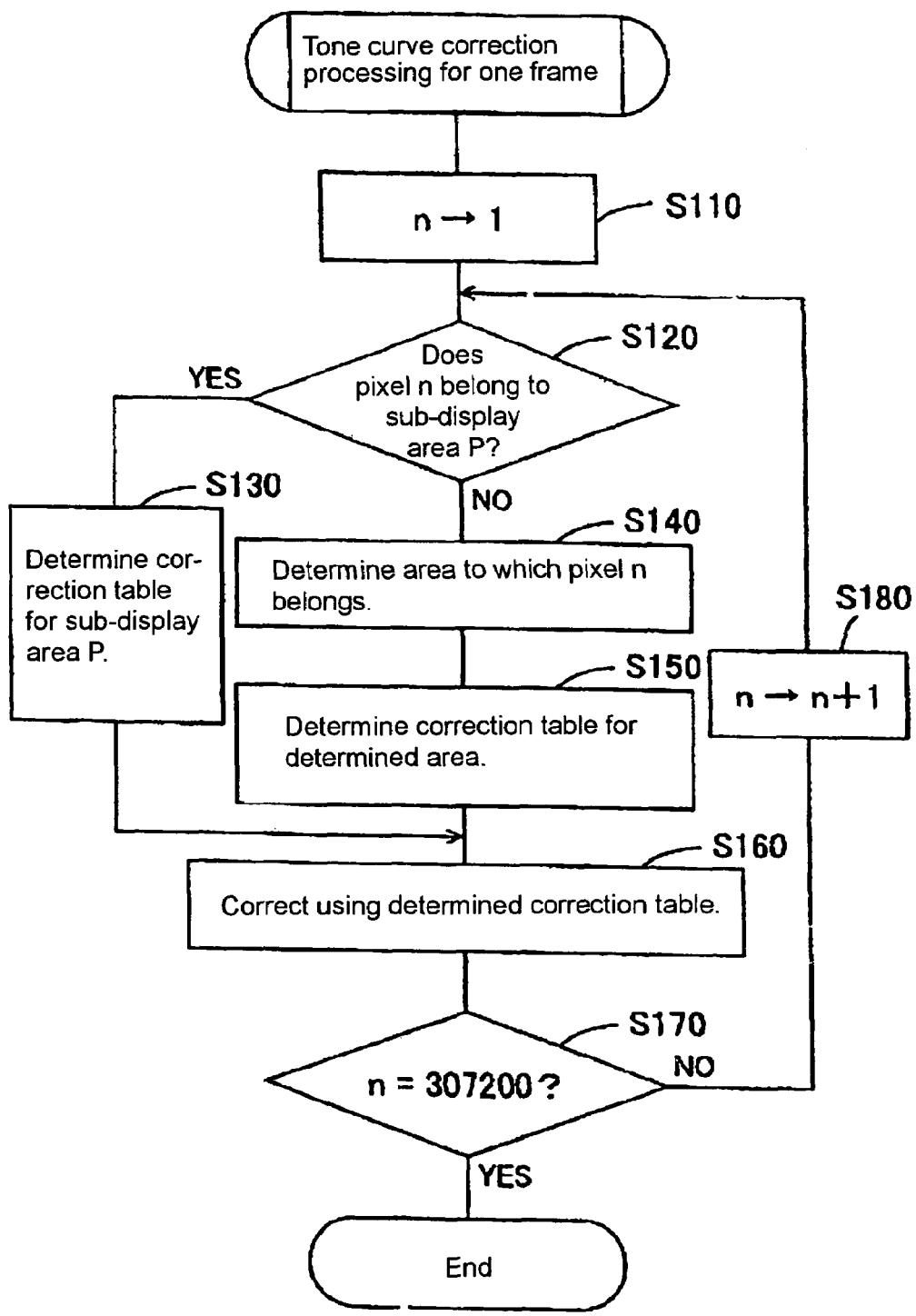
FIG. 6 shows a flowchart of tone curve correction processing for one frame of image.

In the tone curve correction circuit, tone curve correction is performed based on the setting table 114 described above. In the following, the flow of tone curve correction processing will be described with reference to the flowchart shown in FIG. 6. The flowchart shown in FIG. 6 represents the flow of processing for one frame of image. First, in step S110, serial pixel number n is set to 1. Every one of the pixels required to form one frame of image is assigned a serial number represented by the serial pixel number n.

In step S120, whether or not the coordinates of the pixel to be subjected to tone curve correction processing belong to the sub-display area P is determined based on the coordinate table 115 and the setting table 114. FIG. 7 shows an example of the coordinate table 115. The coordinate table 115 shown in FIG. 7 defines the correspondence between the serial pixel number n and the abscissa (X) and ordinate (Y). First in step S120, the abscissa (X) and ordinate (Y) of the pixel are determined by referring to the coordinate table 115. Next, by referring to the setting table 114, whether or not the determined coordinates belong to the sub-display area P is determined. If they belong to the sub-display area P, processing advances to step S130. In step S130, by referring to the setting table 114, which one of the correction tables 113a to 113c is to be used for the sub-display area P is determined. That is, the correction table to be used for the sub-display area P is determined based on the setting pattern with an ON indication set in the user setting column 114b.

If it is determined in step S120 that the pixel does not belong to the sub-display area P, processing advances to step S140. In step S140, which one of the areas A, B, C, and D the pixel belongs to is determined. Next, in step S150, which one of the correction tables 113a to 113c is to be used for the area A, B, C, or D to which the pixel has been determined to belong in step S150 is determined.

In step S160, tone curve correction processing is performed using the correction table 113a, 113b, or 113c that has been determined in step S130 or step S150. The gradation value of the pixel before tone curve correction is read out from the VRAM3 by referring to the address prescribed for the pixel in the VRAM3 and the output gradation value corresponding to the input gradation value of the pixel is newly stored at the address. In step S170, whether or not the current serial pixel number is the last one for the frame is determined. If it is the last serial pixel number for the frame, tone curve correction processing for the frame is terminated. If it is not, processing advances to step S180 where the serial pixel number is incremented by one to allow tone curve correction processing for the next pixel to start. Even though, in the present embodiment, the pixels to form one frame of image undergo tone curve correction processing in the order of their serial pixel numbers, tone curve correction processing may be applied to the pixels in the order of their addresses in the VRAM3.

By proceeding as described above, it is possible to selectively use the correction tables 113a to 113c for each area complying with settings made by the user. Also, in step S120, whether or not a pixel belongs to the sub-display area P is determined. If the pixel is found to belong to the sub-display area P, reference is made to the correction tables 113a to 113c set for the sub-display area P on a priority basis and the pixel is then subjected to tone curve correction processing.

(3) Conclusion

As described above, according to the present invention, performing tone curve correction by referring to one of plural correction tables selected according to the areas of a display screen makes it possible to obtain an output image meeting user's requirements. Particularly, since tone curve correction can be performed using different correction tables for a main screen and a subscreen, an uncomfortable imbalance in brightness between the main screen and the subscreen can be removed.

What is claimed is:

1. A flat panel television having gradation value correction mechanism, comprising:
   a display;
   an image data generating device for generating image data that is comprised of pixels having gradation values;
   the image data generating device generates a main image data and one or more sub-image data, with the main image day displayed on the entire display and the one or more sub-image data superimposed on the main image data and displayed as one or more sub-displays of the entire display;
   a plurality of correction tables that store a correspondence between the gradation values of pixels and corrected gradation values of pixels;
   a setting table for storing correspondences between one or more divided areas of the display and the plurality of correction tables used for correcting the gradation values of pixels that exist in a selected divided area of the one or more divided areas of the display;
   a microcomputer for updating the setting table based on a first user selection to select main display modes specifying a combination of the correction tables corresponding to each of the one or more divided areas of the display and a second user selection to select correction tables corresponding to the one or more sub-displays; and
   an image correction unit for correcting the gradation values of each pixel based on the correction tables corresponding to the area where the pixels exist.

2. A method for gradation value correction for a flat panel television, comprising:
   providing a display;
   generating a main image data and one or more sub-image data that are comprised of pixels having gradation values;
   displaying the main image data on the entire display;
   superimposing the one or more sub-image data on the main image data and displaying the superimposed one or more sub-image data as one or more sub-displays of the entire display;
   assigning an identifier to a pixel on the display and associating, the identifier for that pixel with a coordinate position of that pixel on the display within a coordinate table;
   selecting the pixel;
   determining the coordinate position of the selected pixel from the coordinate table;
   determining if the selected pixel is within a sub-display area of one or more sub-displays using a setting table;
   the setting table storing correspondences between one or more divided areas of the display, including the one or more sub-displays, and a plurality of correction tables used for correcting gradation values of pixels that exist in a selected divided area of one or more divided areas of the display and the one or more sub-displays;
   if it is determined that the selected pixel is within the sub-display area of one or more sub-displays, determining a corresponding correction table for that sub-display area, and correcting the gradation values of the selected pixel using the determined corresponding correction table;
   if it is determined that the selected pixel is not within a sub-display area of one or more sub-displays, determining a divided area of the one or more divided areas within which the selected pixel is located, determining the corresponding correction table for the determined divided area, and correcting the gradation values of the selected pixel using the determined corresponding correction table.

* * * * *